Dec. 27, 1966   C. R. FEGLEY ETAL   3,294,948
AUTOMATIC RESISTANCE WELDING MACHINE
Filed June 2, 1964   5 Sheets-Sheet 1
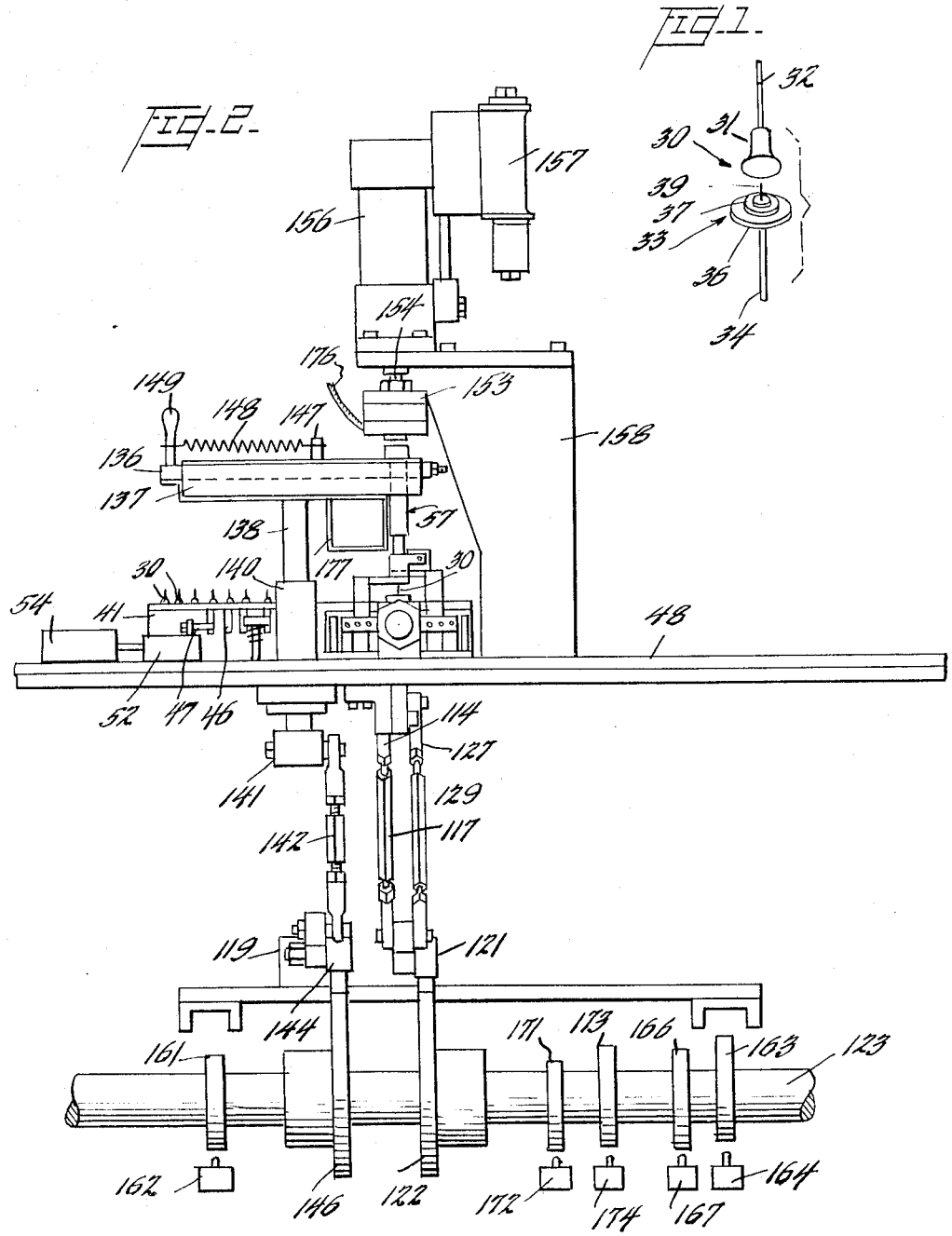
Inventors
Charles R. Fegley
Donald E. Horning
John H. Mattes,
By R. P. Miller
Attorney

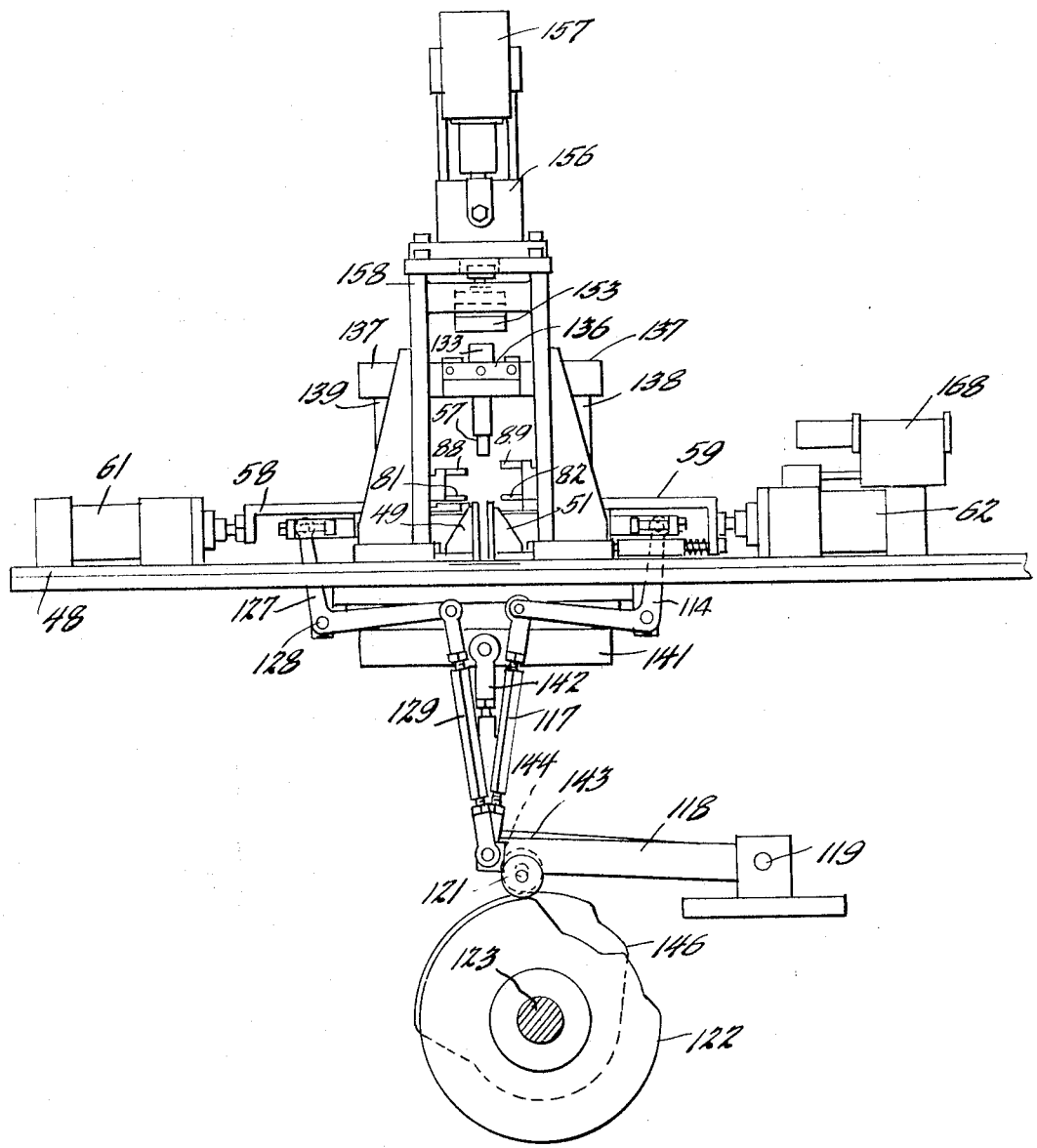

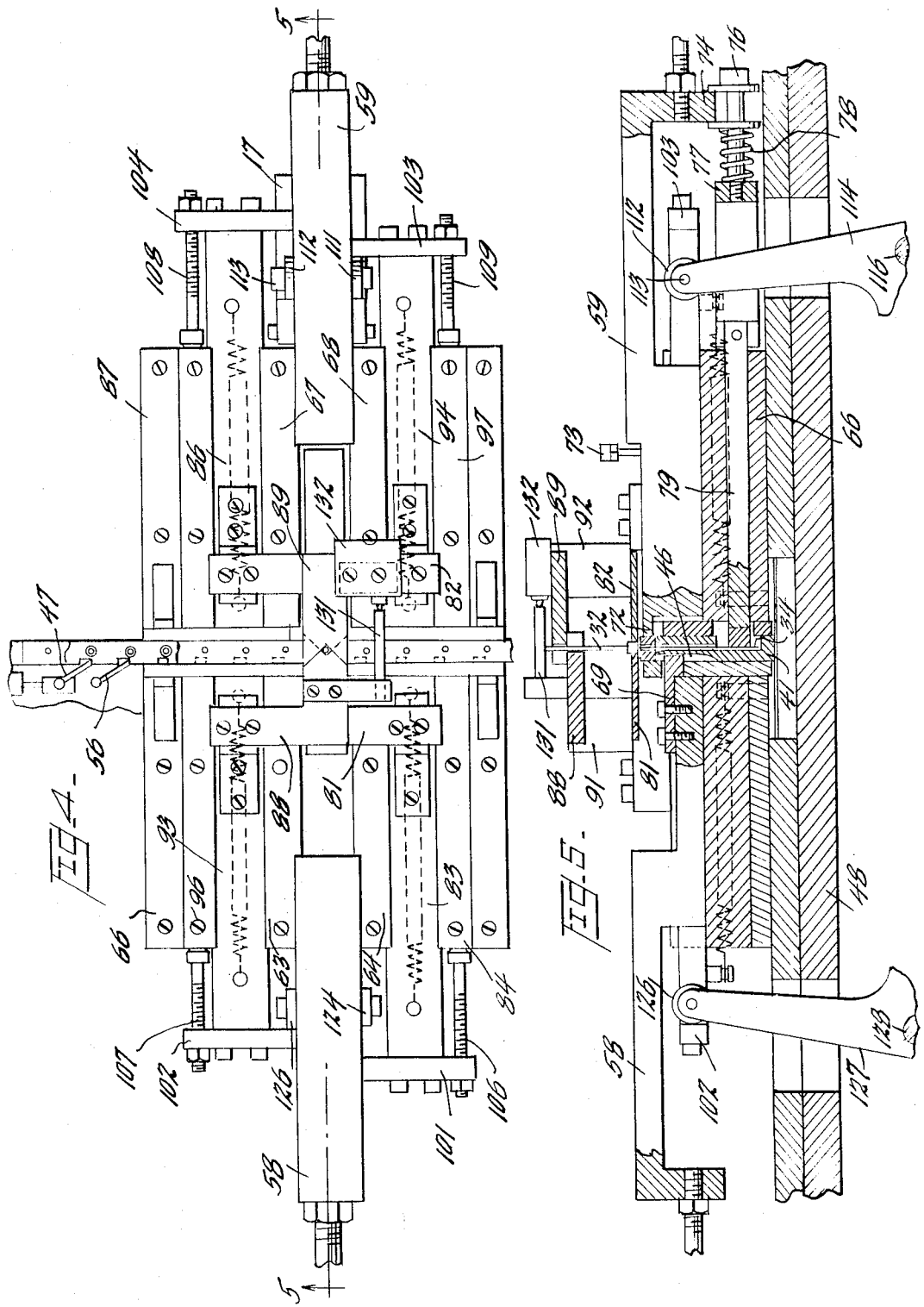

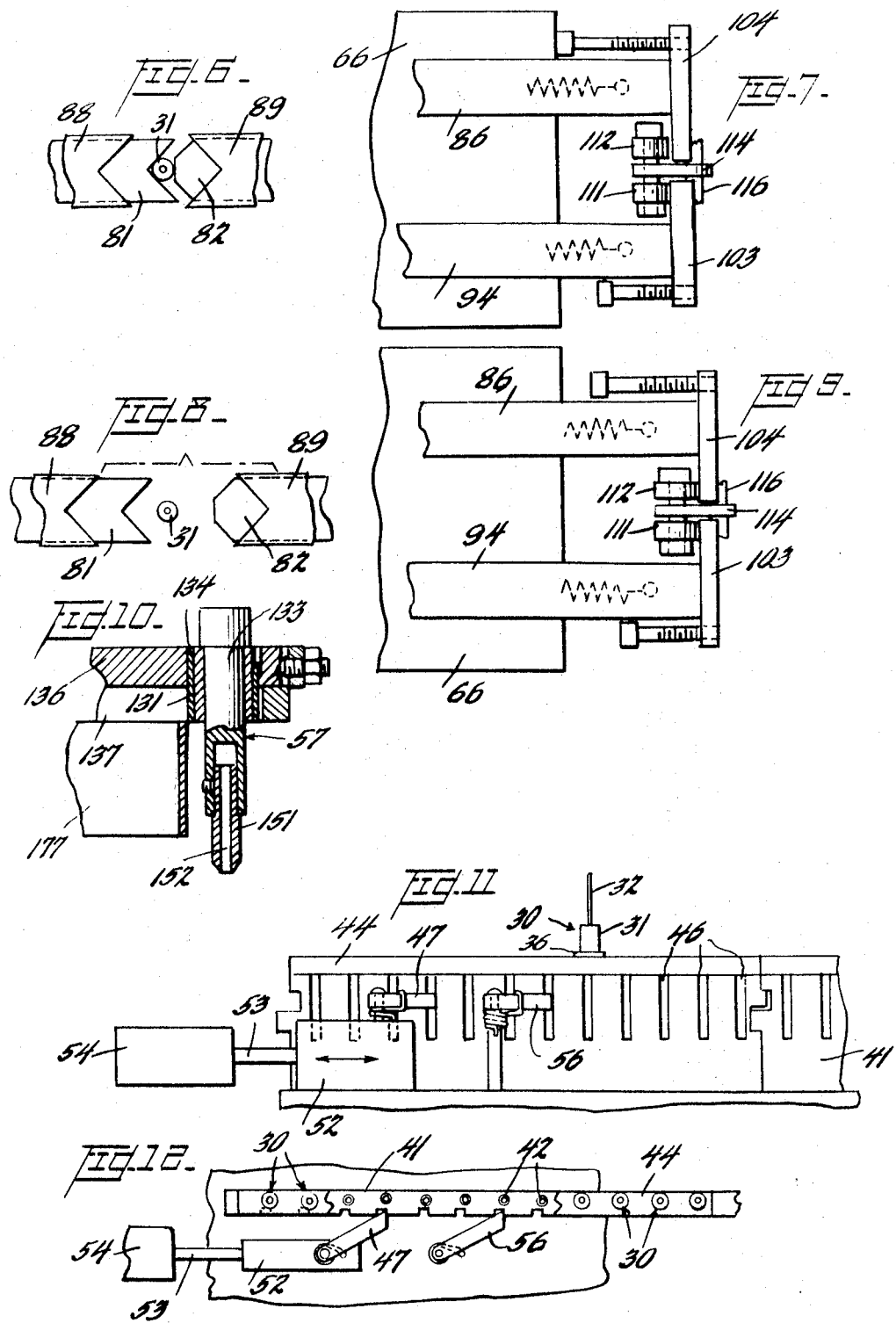

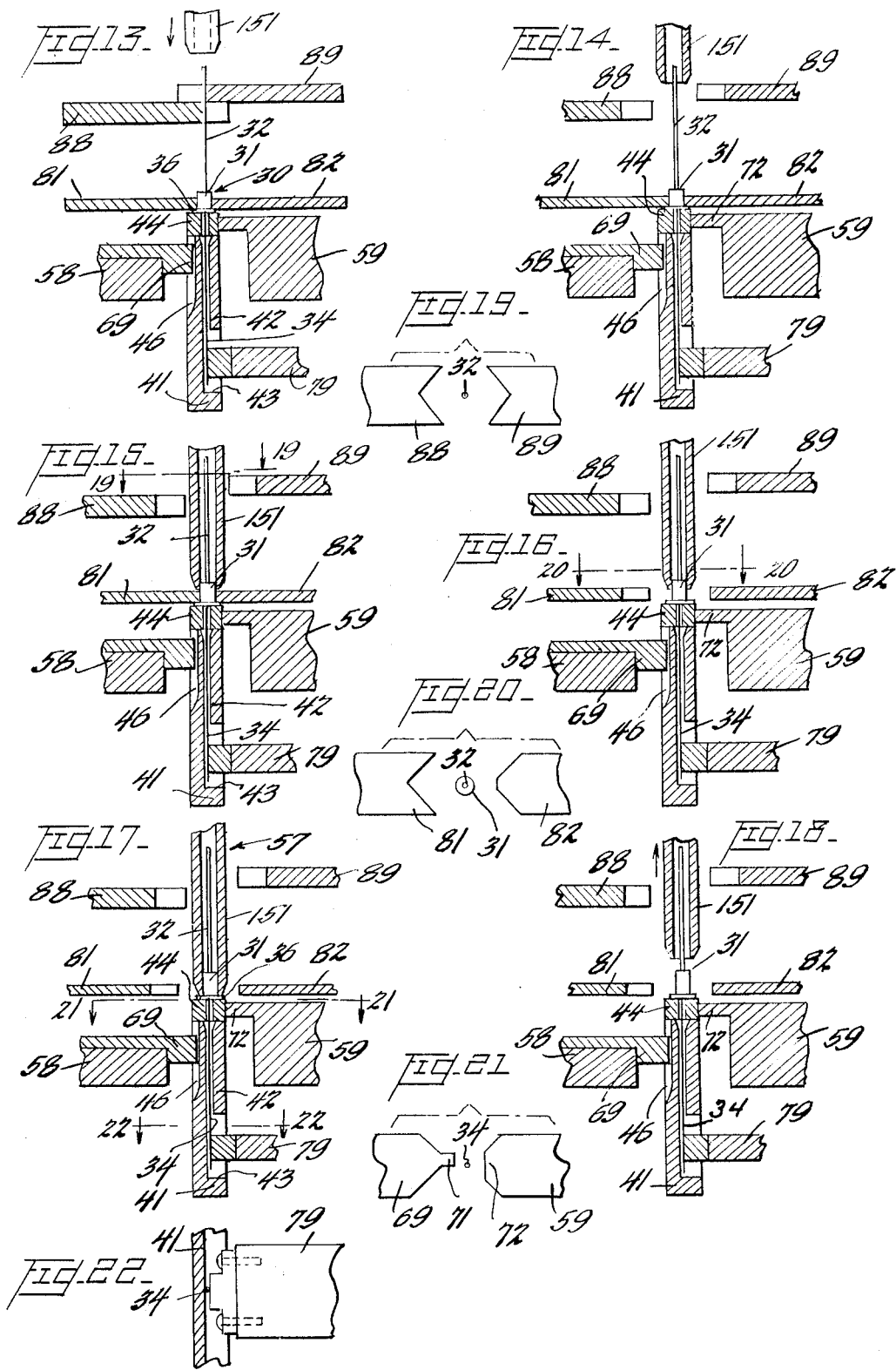

United States Patent Office 3,294,948
Patented Dec. 27, 1966

3,294,948
AUTOMATIC RESISTANCE WELDING MACHINE
Charles R. Fegley, Laureldale, Donald E. Horning, Wyomissing, and John H. Mattes, Reading, Pa., assignors to Western Electric Company, Incorporated, New York, N.Y., a corporation of New York
Filed June 2, 1964, Ser. No. 372,123
7 Claims. (Cl. 219—78)

This invention relates to an automatic resistance welding machine and more particularly to a machine having facilities for accurately positioning components in anticipation of a welding operation in conjunction with facilities for forcibly impacting one welding electrode against another to further insure that the components are firmly and accurately positioned during the subsequent welding operation.

In the manufacture of germanium or silicon diodes, the active elements are mounted on a metallic stud and are enclosed within a casing. The casing is provided with a tubulation for receiving a lead wire and an annular flange which is welded to the stud, thus sealing the active elements within the casing. Problems exist in accurately aligning the small components during the welding operation and in insuring that the casing is welded to the stud to provide a hermetic seal.

An object of the invention resides in a new and improved automatic resistance welding machine.

Another object of the invention is the provision of a welding machine wherein a first electrode is moved into holding engagement with articles to be welded and then a second electrode or element is impacted against the first electrode to insure that the articles are in intimate contact during a subsequent welding operation.

A further object of the invention resides in holding devices which accurately position articles to be welded and then are moved to permit a welding electrode to advance into position to hold the articles during a welding operation.

An additional object of the invention is to provide a welding machine having a plurality of operating mechanisms which cyclically operate to position and hold articles to be welded and which preclude a welding operation when one of the articles is missing.

With these and other objects in view, the present invention contemplates a welding machine having a first electrode that functions to align and hold components to be welded and which is subsequently struck by a second electrode to firmly and positively hold the components during a subsequent welding operation. More particularly, the components in the form of diode elements are advanced by a rack into a welding position whereat a plurality of slides are sequentially operated to grip and align the components within the rack. Certain of the slides are then withdrawn while a first electrode moves into position to hold the released components. A second electrode is thereupon thrust forward and impacted against the first electrode to firmly seat the components against each other. Welding current is now passed through the electrodes to weld the components together.

If one of the components is missing, a pair of the slides will over-travel and actuate a switch to interrupt the circuit for passing current through the welding electrodes.

Other objects and advantages of the invention will become apparent upon consideration of the following detailed description when considered in conjunction with the following drawings; wherein:

FIG. 1 is an exploded view of a tubulated can or casing and a semiconductor wafer assembly that are to be welded together by the machine shown in the other views;

FIG. 2 is a front elevational view of a machine for automatically welding diode assemblies embodying the principles of the present invention;

FIG. 3 is a right-sided elevational view of the machine shown in FIG. 2 particularly illustrating a group of mechanisms that function to grip and weld the diode assembly;

FIG. 4 is a top plan view of the welding machine with the upper welding electrodes removed for the purposes of illustrating the various slides which function to grip and locate the diode assembly in anticipation of a welding operation;

FIG. 5 is a cross sectional view taken along line 5—5 of FIG. 4 further illustrating the gripping and locating slides together with a lower slide electrode;

FIGS. 6 and 7 are segmentary views showing the diode case gripping jaws and slides in a partially withdrawn position;

FIGS. 8 and 9 are segmentary views similar to those shown in FIGS. 6 and 7 showing the diode case gripping jaws and slides in a fully withdrawn position;

FIG. 10 is a sectional view showing the mounting for one of the upper welding electrodes;

FIG. 11 is an enlarged schematic view of a feed mechanism for advancing a rack of diode assemblies into the welding machine;

FIG. 12 is a top view of the rack feed mechanism shown in FIG. 11;

FIGS. 13 through 18 are sectional views of the welding electrodes in conjunction with the various locating and gripping slides depicting the positional relationship of these elements from the time that a diode assembly is gripped until after the assembly has been welded;

FIG. 19 is a sectional view taken along line 19—19 of FIG. 15 showing the configuration of an upper pair of diode tubulation gripping jaws;

FIG. 20 is a sectional view taken along line 20—20 of FIG. 16 showing the configuration of a lower pair of diode case gripping jaws;

FIG. 21 is a sectional view taken along line 21—21 of FIG. 17 showing the configuration of a rack locating slide bar together with the lower welding electrode; and FIG. 22 is a sectional view taken along line 22—22 of FIG. 17 showing the configuration of a stud wire gripping member.

Referring first to FIG. 1, there is shown an exploded view of a diode assembly 30 having a flanged can or casing 31 having a tubulation 32, that is to be welded to a semiconductor wafer assembly generally designated by the reference numeral 33. This wafer assembly 33 comprises a gold-plated stud wire 34, a disc-like stud 36, a wafer 37 of semiconductor material, and a thin fragile gold wire 39 that fits within the tubulation 32. The machine forming the subject matter of the present invention may be used to weld the flange of casing 31 to the stud 36.

Rack feed mechanisms

Referring first to FIGS. 2, 11, 12, and 13, the diode assemblies 30 are loaded in a rack 41 with the stud wires 34 extending into apertures 42 formed to extend from the top surface of the rack 41. As best illustrated in FIG. 13, the aperture 42 extends down into a longitudinal slot 43 formed along one side of the rack 41. A conducting bus bar 44 is attached to the upper surface of the rack body and actually provides the support for the stud 36 on which is mounted the casing 31. The casing 31 may be tack-welded to the stud by a machine such as that shown in copending application of C. R. Fegley, Serial No. 327,971, filed December 4, 1963, or it may be loosely positioned on the stud with the gold wire 39 extending into the tubulation 32.

In order to feed the rack 41, the other side is provided with vertical slots 46 into which a feed pawl 47 may be advanced to push the rack along an upper surface of an elevated platform 48 (see FIG. 2) and between guide plates 49 and 51 (see FIG. 3). Returning now to FIGS. 11 and 12, the feed pawl 47 is shown as being mounted on a slide block 52 and is spring-urged into a slot 46. The slide block 52 is attached to a piston rod 53 extending into an air cylinder 54. During return movement of the pawl 47 and the slide 52, a spring-urged antiretrograde pawl 56 engages the rack 41 within a slot 46 to hold the rack in each advanced position.

*Lower slide mechanisms*

Referring now to FIGS. 2, 3, 4, and 5, the rack 41 is incrementally advanced to move each succeeding diode casing 31 into alignment with a ring-like welding electrode 57. Following each advance of the rack, a pair of slides 58 and 59 are sequentially moved toward each other by operation of a pair of air cylinders 61 and 62 (see FIG. 3). Slide 58 is mounted to move between gibs 63 and 64 secured to a frame housing 66 (see FIG. 4). The slide 59 is mounted for movement between gibs 67 and 68 also secured to the housing 66.

Referring to FIGS. 5, 17, and 21, the forward extremity of the slide 58 has mounted thereon a plate 69 having a beveled tip 71 that is moved into a slot 46 formed in the side of the rack 41 to accurately locate and lock the rack in the welding position. The slide 59 serves as a lower welding electrode and is provided with a projecting tip 72 that engages the bus bar 44 secured to the rack 41. A grounded electrical terminal post 73 is also mounted on the slide 59.

The slide 59 has a depending arm 74 (see FIG. 5) which is apertured to receive a headed bolt 76 threaded within a yoke 77. Interposed between the yoke 77 and the arm 74 is a spring 78 which urges the yoke 77 to follow the movement of the slide 59. The forward end of the yoke 77 is attached to a slide bar 79 mounted for movement within the housing 66. The forward end of the slide bar 79 (see FIGS. 5 and 22) is moved to engage and accurately hold the stud wire 34 within the slot 43 formed in the rack 41.

*Upper slide mechanisms*

After a diode assembly 30 has been moved into the welding position, both the casing 31 and the tubulation 32 are gripped to accurately align the diode assembly 30 in anticipation of a welding operation. The casing is gripped between a pair of gripping jaws or members 81 and 82 (see FIGS. 3 and 5) each of which consists of an L-shaped bracket. Gripping member 81 is mounted on a spring-urged slide 83 (see FIG. 4) positioned between gibs 64 and 84. Gripping member 82 is attached to a spring-urged slide 86 which is positioned between gibs 67 and 87.

The tubulation 32 is gripped between a pair of jaws or members 88 and 89 (see FIGS. 4 and 5) formed as L-shaped brackets that are attached to posts 91 and 92. The posts 91 and 92 are, respectively, mounted on spring-urged slides 93 and 94. Slide 93 is positioned to move between gibs 63 and 96 whereas slide 94 is positioned to move between gibs 68 and 97. The configurations of the forward extremities of the gripping members 88 and 89 are best illustrated in FIG. 19 wherein the members are shown with V-shaped notches to encompass the tubulation 32. As shown in FIGS. 5 and 13, the gripping member 89 overlies the gripping member 88 to permit the members to firmly grip the tubulation 32 within the V-shaped notches. The gripping members 81 and 82 are provided with a notch and beveled complimentary projection (see FIG. 20) to grip the casing 31 when these members are moved toward each other.

In order to move the slides 83, 86, 93, and 94, these slides are secured to actuator bars 101, 102, 103, and 104 (see FIG. 4). The actuator bars 101 to 104 are provided with adjustable stop screws 106, 107, 108, and 109. Actuated bars 103 and 104 are engaged by a pair of rollers 111 and 112 mounted on a stud shaft 113 which extends through one end of an L-shaped lever 114 (see FIG. 5) pivotally mounted about a shaft 116.

Referring to FIG. 3, lever 114 is shown connected to an adjustable link 117 that is attached to a rocker arm 118 pivotally mounted on a support 119. Rotatably mounted on the rocker arm 118 is a cam follower 121 that rides on the periphery of a cam 122 attached to a main drive shaft 123.

In a like manner, actuator bars 101 and 102 are engaged by a pair of rollers 124 and 126 (see FIG. 4) which are rotatably mounted on an L-shaped lever 127 pivotally mounted about a pivot shaft 128 (see FIGS. 3 and 5). The lever 127 is attached to an adjustable link 129 connected to the rocker arm 118. It may be thus appreciated that the pivoting of the rocker arm 118 by the action of the cam 122 results in a simultaneous pivoting in the L-shaped levers 114 and 127 to allow all four slides 83, 86, 93 and 94 to commence movement toward a diode assembly 30 located in the welding position. The slides 83 and 86 move gripping members 81 and 82 into engagement with the casing 31 prior to the engagement of the tubulation 32 by the gripping members 88 and 89.

This sequential movement of gripping member is accomplished by the initial positioning of the members 81 and 82 in advance of the members 88 and 89. The adjustable stop screws 106 and 108 (see FIGS. 4 and 7) initially engage the housing 66 to limit the extent of the movement of the slides 83 and 86 and thus movement of the members 81 and 82. At this time the gripping members 81 and 82 move into engagement with the casing 31 as illustrated in FIG. 6. Upon further pivoted movement of the levers 114 and 127, the rollers 112 and 126 move from engagement with the actuator bars 101 and 103. However, the actuator bars 102 and 104 continue to follow the rollers 124 and 117 until the gripping members 88 and 89 engage the tubulation 32. If the tubulation 32 is not present, the gripping members 88 and 89 will overtravel and a switch actuator 131 mounted on the gripping member 88 will engage and operate a switch 132 connected in the welding circuit (not shown) to preclude a subsequent application of the welding current.

*Upper welding electrode mechanisms*

Referring now to FIGS. 2, 3, and 10, for a consideration of the upper welding electrode 57, it will be noted that the welding electrode comprises a headed conductive cylinder 133 that is slightly force-fitted in a sleeve 134 mounted in a slide 136. Slide 136 is mounted for movement in gib frame 137 supported on a pair of push rods 138 and 139. The push rods 138 and 139 extend through bearings 140 mounted on platform 48 and are mounted in a crossbar 141 attached to an adjustable link 142 that is connected to a rocker arm 143 pivotally mounted on the support 119. Rocker arm 143 is provided with a cam follower 144 that rides on the periphery of a cam 146 so as to vertically reciprocate the crossbar 141, the push rods 138 and 139, the gib frame 137, and hence, the welding electrode 57.

Attached to the gib frame is an anchor post 147 onto which is attached one end of a spring 148, the other end of which is connected to a handle 149 mounted on the slide 136. The spring 148 is a tension spring and urges the welding electrode 57 into alignment with the diode assembly 30. Upon exerting a force to the handle 149, the slide 136 may be moved to the left as viewed in FIG. 2 to permit the removal of the welding electrode 57. The welding electrode may be tapped slightly to release it from the sleeve 134.

The cylindrical member 133 of the electrode 57 (see FIG. 10) is counterbored to receive a sleeve-like or ring-like welding tip 151. The welding tip is provided with a bore 152 which accommodates the tubulation 32 and the casing 31 when the welding electrode is moved into the welding position. The lower extremity of the tip 151 is adapted to engage the flange portion of the case 31 to weld the flange to the stud 36.

The casing 31 is impacted and forced against the stud 36 by a ram electrode 153 (see FIGS. 2 and 3) positioned in alignment with the headed cylindrical member 133 of the electrode 57. This ram electrode is connected to a piston rod 154 extending from an air cylinder 156 which is controlled by a solenoid valve 157. A standard 158 secured to the platform 48 provides a support for the air cylinder 156 and solenoid valve 157. When the welding electrode 57 is moved down into the welding position, the subsequent operation of the solenoid valve 157 admits air to the cylinder 156 to thrust the piston rod 154 and the ram electrode 153 in a downward direction thereby thrusting the ram electrode into engagement with the electrode 57. The force imparted to the electrode 57 is effective to forcibly impact the flange of the casing 31 against the stud 36 to insure that the entire periphery of the flange is intimately engaged with the stud.

Operation

In automatic operation of the machine, the main drive shaft 123 (see FIG. 2) will continuously rotate and, first, a cam 161 actuates a switch 162 to complete a simple energizing circuit for a solenoid valve which controls the admission of air to the cylinder 54. Admission of air to the cylinder 54 is accompanied by an advance of the slide block 52 to index the rack 41 to position a diode assembly 30 in alignment with the welding electrode 57. A cam 163 operates a switch 164 to energize a simple circuit for a solenoid valve which controls the admission of air to the cylinder 61 (see FIG. 3). The slide 58 is thus moved to the right as viewed in FIGS. 3, 13, and 21 to advance the beveled tip 71 of plate 69 into the aligned slot 46 formed in the side of the rack 41 to lock the rack and thus accurately register the diode assembly 30 with the welding electrode 57.

Immediately following the locking of the rack 41, a further cam 166 on shaft 123 operates a switch 167 to complete a simple energizing circuit for a solenoid valve 168 (see FIG. 3) associated with the air cylinder 62. The lower welding electrode slide 59 is thus advanced into engagement with the bus bar 44 secured to the rack 41. As the slide 59 advances toward the left as viewed in FIG. 5, the forward end of the slide bar 79 is also moved to engage and firmly hold the stud wire 34 within the slot 43 (see also FIG. 13).

As the main drive shaft 123 continues to rotate, cam 122 is rendered effective to pivot the levers 114 and 127 whereupon the slides 83, 86, 93, and 94 move toward the rack 41. The forward movement of the slides 83 and 86 acts to move first the gripping members 81 and 82 into engagement with the casing 31 (see FIGS. 5, 6, and 7). Immediately following engagement of the casing 31 by the gripping members 81 and 82, the gripping members 88 and 89, mounted on the slides 93 and 94, move into engagement with the projecting tubulation 32. The entire diode assembly 30 is now accurately aligned with the electrode 57 in anticipation of the welding operation.

Cam 146 now moves rocker arm 143 to lower the crossbar 141 and the gib assembly 137 whereupon the electrode 57 is moved toward the positioned diode assembly 30 as illustrated in FIGS. 2 and 13. As the tip 151 of the welding electrode 57 approaches the gripping members 88 and 89, cam 122 pivots the levers 114 and 127 to move the slides 93 and 94 to withdraw the gripping members 88 and 89 from engagement with the tubulation 32 (see FIG. 14). As the welding tip 151 approaches the gripping members 81 and 82 as shown in FIG. 15, these gripping members are withdrawn as shown in FIGS. 8 and 16. This is accomplished because the rollers 112 and 126 which were spaced from the actuator bars 101 and 104 now engage these bars and move them to the left and right as clearly shown in FIGS. 4, 7, and 9. The welding tip 151 now advances to receive the casing 31 within the bore 152 as shown in FIG. 17.

A cam 171 now operates a switch 172 to complete a simple energizing circuit for the solenoid valve 157 whereupon air is admitted to the cylinder 156. The ram electrode 153 is thrust downwardly to forcibly impact the electrode 57. The tip 151 of the electrode 57 is thrusted against the flange of the casing 31 to forcibly engage the flange against the stud 36. As soon as the ram electrode 153 moves down, a cam 173 operates a switch 174 to apply welding current through lead 176 (see FIG. 2) attached to the ram electrode 153. The flange of the casing 31 is welded to the stud 36 to provide a hermetic seal for the protection of wafer 37 within the casing 31.

Following the welding operation, the ram electrode 153 is withdrawn and cam 146 is rendered effective to lift the electrode 57 from the welding position. As the welding electrode 57 is withdrawn, the slide bar 79 is retained in engagement with the wire 34 as shown in FIG. 18 to hold the casing 31 from movement with the tip 151 of the withdrawing electrode 57.

If during a cycle of operation of the machine, the gripping members 88 and 89 do not encounter a tubulation 32, then the switch 132 is operated by the actuator 131 mounted on the gripping member 88. Switch 132 is connected in the welding circuit to thereby preclude a welding operation when a tubulation 32 is missing.

In order to protect the other diode assemblies 30 in the rack 41 from the effects of the electrical field set up by the welding current, a U-shaped shield 177 is secured to the underside of the gib frame 137 as best shown in FIGS. 2 and 10. This shield is formed of high silicon steel and diverts the magnetic lines of flux set up as a result of the welding current. If the shield is not provided, the electrical field set up by the welding current is sufficient to withdraw the other unwelded diode assemblies 30 from the rack 41.

It is to be understood that the above-described arrangements of apparatus and construction of elemental parts are simply illustrative of an application of the principles of the invention and may other modifications may be made without departing from the invention.

What is claimed is:
1. In a welding machine,
    means for supporting a pair of weldable articles in abutting relation,
    a first welding electrode mounted for movement into engagement with a first of said articles,
    a second welding electrode mounted for movement into engagement with said supporting means,
    means for moving said first and second welding electrodes into engagement with said first article and said supporting means,
    means for applying a striking force to one of said electrodes to forcibly impact said articles into further engagement, and
    means rendered effective upon application of said striking force for applying welding current through said electrodes and said articles.
2. In a welding machine,
    electrically conductive means for holding a pair of weldable articles in abutting relation,
    a welding electrode mounted for movement into engagement with the first of said held articles,
    a ram electrode mounted for movement into engagement with said welding electrode, means for moving said welding electrode into engagement with said first article, and means for moving said ram electrode in the same direction as said welding electrode to strike said welding electrode to forcibly impact said welding electrode against said first article.

3. In a welding machine for welding a pair of loosely assembled components, electrically conductive means for supporting the components in a loosely assembled relation, a welding electrode shaped to conform to the shape of a first of the components, means for moving said welding electrode into engagement with said first component to hold said components against said support, a ram electrode mounted for movement into engagement with said welding electrode, means for forcibly impacting said ram electrode in the same direction as said welding electrode against said welding electrode to firmly secure said components in said assembled relation, and means for applying welding energy through said electrodes, the assembled components and the electrically conductive supporting means.

4. In a welding machine, an electrically conductive holder for supporting components of an article to be welded together, a plurality of vertically aligned and opposed pairs of slide means mounted for movement toward each other to grip one of said components, an electrode having an axial bore to receive the portions of said component gripped by said slide means, means for moving said electrode toward said gripped component to advance said bore to receive said component, means rendered effective upon advance of said electrode for successively moving said slide means away from said component as the electrode moves and the component is received within said bore, a welding circuit means having a pair of terminations, means for selectively connecting one of said terminations to said holder, and means rendered effective upon completion of the advance of said electrode for connecting the other termination to said electrode.

5. In a welding machine, a pair of opposed slides mounted for movement toward and away from each other, means intermediate said slides for holding an article, a pair of article gripping members respectively mounted on the slides for gripping an article positioned between said members on said holding means, a welding means mounted for movement toward an article gripped between said members, means for moving said slides toward and away from each other to grip an article between said members and then release said article as the welding means approaches said gripped article, and means rendered effective upon said gripping members being moved toward each other and not gripping an article for rendering said welding means ineffective.

6. In a welding machine for welding a flanged case to a stud having a depending wire, a rack having a vertically extending aperture therein to receive said depending wire, said rack having slot intersecting said aperture to expose said depending wire, a conductive bar attached to said rack for supporting said stud, a first slide movably mounted to engage and hold said exposed wire, a first electrode movably mounted to engage said conductive bar, a pair of opposed slides having gripping elements projecting toward each other, means for moving said first slide and first electrode toward and away from said rack to engage said exposed wire and conductive bar, means rendered effective during engagement of said exposed wire and conductive bar for reciprocating said pair of opposed slides to grip and the position flanged case on said stud, a second electrode mounted for movement to engage said flanged case, means for moving said second electrode to engage said case as said opposed slides move out of engagement with said case, and means for applying welding current through said second electrode, the flanged case, the stud, the conductive bar and the first electrode.

7. In a machine for welding together a flanged casing to a stud of a component, electrically conductive means for supporting the stud of a component with said casing resting thereon and extending above said supporting means, a pair of opposed slides having a pair of holding members respectively mounted hereon, means for reciprocating said slides toward and away from each other to grip the component between said holding members, a ring electrode mounted for movement toward the component gripped by said holding members, means for advancing said ring electrode toward said component after said holding members grip said component and then move the flanged casing into engagement with the stud of said component as the holding members move away from said component, a ram mounted for movement along the same axes of movement of said ring electrode, and means rendered effective upon advance of the ring electrode into engagement with said component for advancing said ram into striking engagement with said ring electrode to force said flanged casing against said stud and said supporting means.

References Cited by the Examiner

UNITED STATES PATENTS

| | | | |
|---|---|---|---|
| 1,006,536 | 10/1911 | Dean | 219—78 |
| 2,264,825 | 12/1941 | Bloomer et al. | 219—86 |
| 2,312,938 | 3/1943 | Stieglitz | 219—89 |
| 3,069,531 | 12/1962 | Hill et al. | 219—78 |
| 3,072,778 | 1/1963 | Cook | 219—78 |

RICHARD M. WOOD, *Primary Examiner.*

B. A. STEIN, *Assistant Examiner.*